US012641417B2

(12) United States Patent
Kapale et al.

(10) Patent No.: US 12,641,417 B2
(45) Date of Patent: May 26, 2026

(54) METHOD AND APPARATUS FOR MANAGING PROVISION OF LOCATION INFORMATION

(71) Applicant: Samsung Electronics Co., Ltd., Gyeonggi-do (KR)

(72) Inventors: Kiran Gurudev Kapale, Bangalore (IN); Arunprasath Ramamoorthy, Bangalore (IN); Basavaraj Jayawant Pattan, Bangalore (IN)

(73) Assignee: Samsung Electronics Co., Ltd (KR)

( * ) Notice: Subject to any disclaimer, the term of this patent is extended or adjusted under 35 U.S.C. 154(b) by 129 days.

(21) Appl. No.: 18/568,499

(22) PCT Filed: Jul. 5, 2022

(86) PCT No.: PCT/KR2022/009684
§ 371 (c)(1),
(2) Date: Dec. 8, 2023

(87) PCT Pub. No.: WO2023/282586
PCT Pub. Date: Jan. 12, 2023

(65) Prior Publication Data
US 2025/0126465 A1 Apr. 17, 2025

(30) Foreign Application Priority Data

Jul. 5, 2021 (IN) .............................. 202141030177
Jul. 4, 2022 (IN) .............................. 202141030177

(51) Int. Cl.
*G06F 15/16* (2006.01)
*H04L 67/306* (2022.01)
(Continued)

(52) U.S. Cl.
CPC ........... *H04W 12/02* (2013.01); *H04L 67/306* (2013.01); *H04L 67/52* (2022.05)

(58) Field of Classification Search
CPC ....... H04W 12/02; H04L 67/52; H04L 67/306
See application file for complete search history.

(56) References Cited

U.S. PATENT DOCUMENTS 10,051,417 B2 8/2018 Borghai
10,356,591 B1 * 7/2019 Tengwall ................ H04W 4/02
(Continued)

FOREIGN PATENT DOCUMENTS

WO WO 2017/201673 11/2017

OTHER PUBLICATIONS

PCT/ISA/210 Search Report dated Oct. 19, 2022, issued on PCT/KR2022/009684, pp. 3.
(Continued)

*Primary Examiner* — Normin Abedin
(74) *Attorney, Agent, or Firm* — The Farrell Law Firm, P.C.

(57) ABSTRACT

The disclosure relates to a 5G or 6G communication system for supporting a higher data transmission rate. The present subject matter refers to method and apparatus for managing provision (or, dissemination) of a location information of a client device. The method includes instructing a client device for sharing the location information; receiving the location information and a request for managing dissemination of the location information; receiving a list for managing dissemination of the location information from the client device. The method includes determining if the client device is authorized to request managing dissemination of the location information based on a client profile and managing dissemination of the location information to the one or more MCX service user in accordance with the list based on determination that the client device is authorized to request managing dissemination of the location information.

12 Claims, 9 Drawing Sheets

(51) Int. Cl.
    *H04L 67/52*         (2022.01)
    *H04W 12/02*       (2009.01)

(56)              References Cited

U.S. PATENT DOCUMENTS

| | | | |
|---|---|---|---|
| 2011/0071880 A1* | 3/2011 | Spector | H04W 76/50 |
| | | | 340/539.13 |
| 2011/0136503 A1 | 6/2011 | Sridhara et al. | |
| 2016/0026821 A1 | 1/2016 | Meredith et al. | |
| 2019/0098098 A1 | 3/2019 | Chen et al. | |
| 2019/0149955 A1* | 5/2019 | Rusu | G06F 21/00 |
| | | | 455/456.1 |
| 2020/0120442 A1 | 4/2020 | Phillips et al. | |
| 2021/0258757 A1* | 8/2021 | McGovern | H04W 4/20 |

OTHER PUBLICATIONS

PCT/ISA/237 Written Opinion dated Oct. 19, 2022 , issued on PCT/KR2022/009684, pp. 5.
Indian Office Action dated Feb. 6, 2023 issued in IN 202141030177, pp. 7.
3GPP TS 33.180 V17.3.0 (Jun. 2021), pp. 204.
3GPP TS 22.280 V17.6.0 (Jun. 2021), pp. 97.

\* cited by examiner

[Fig. 1]
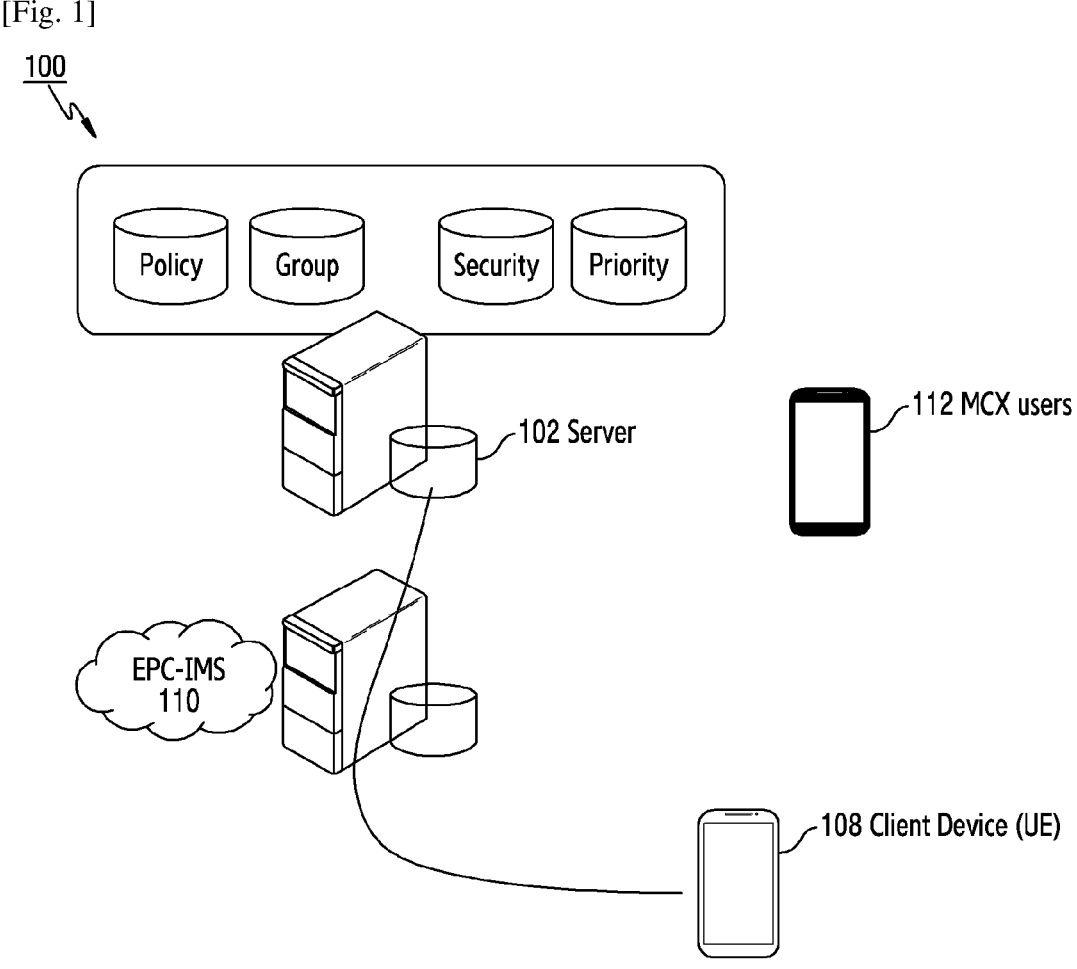

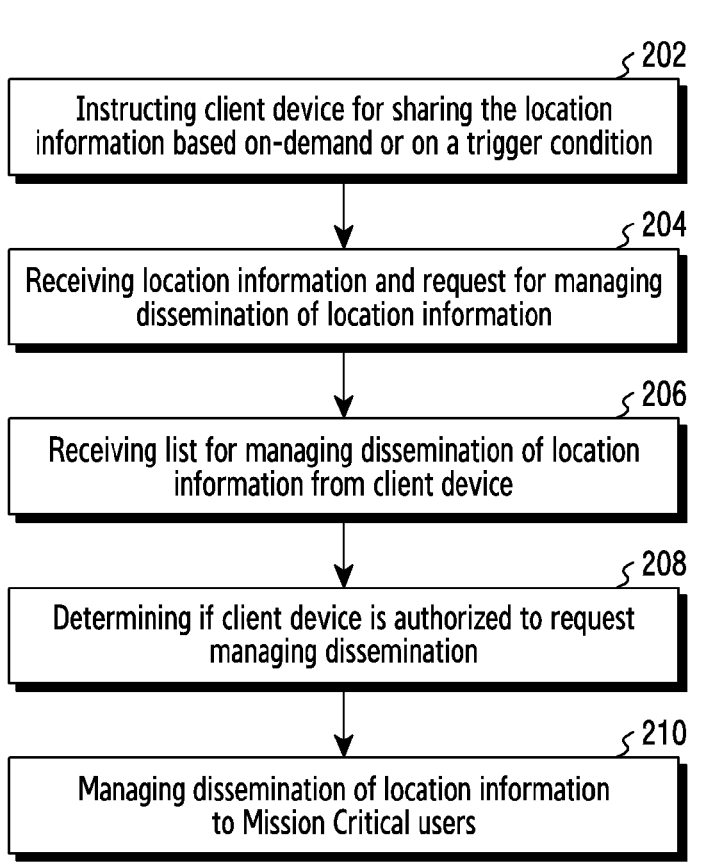

202

Instructing client device for sharing the location
information based on-demand or on a trigger condition

204

Receiving location information and request for managing
dissemination of location information

206

Receiving list for managing dissemination of location
information from client device

208

Determining if client device is authorized to request
managing dissemination

210

Managing dissemination of location information
to Mission Critical users

[Fig. 3]
300
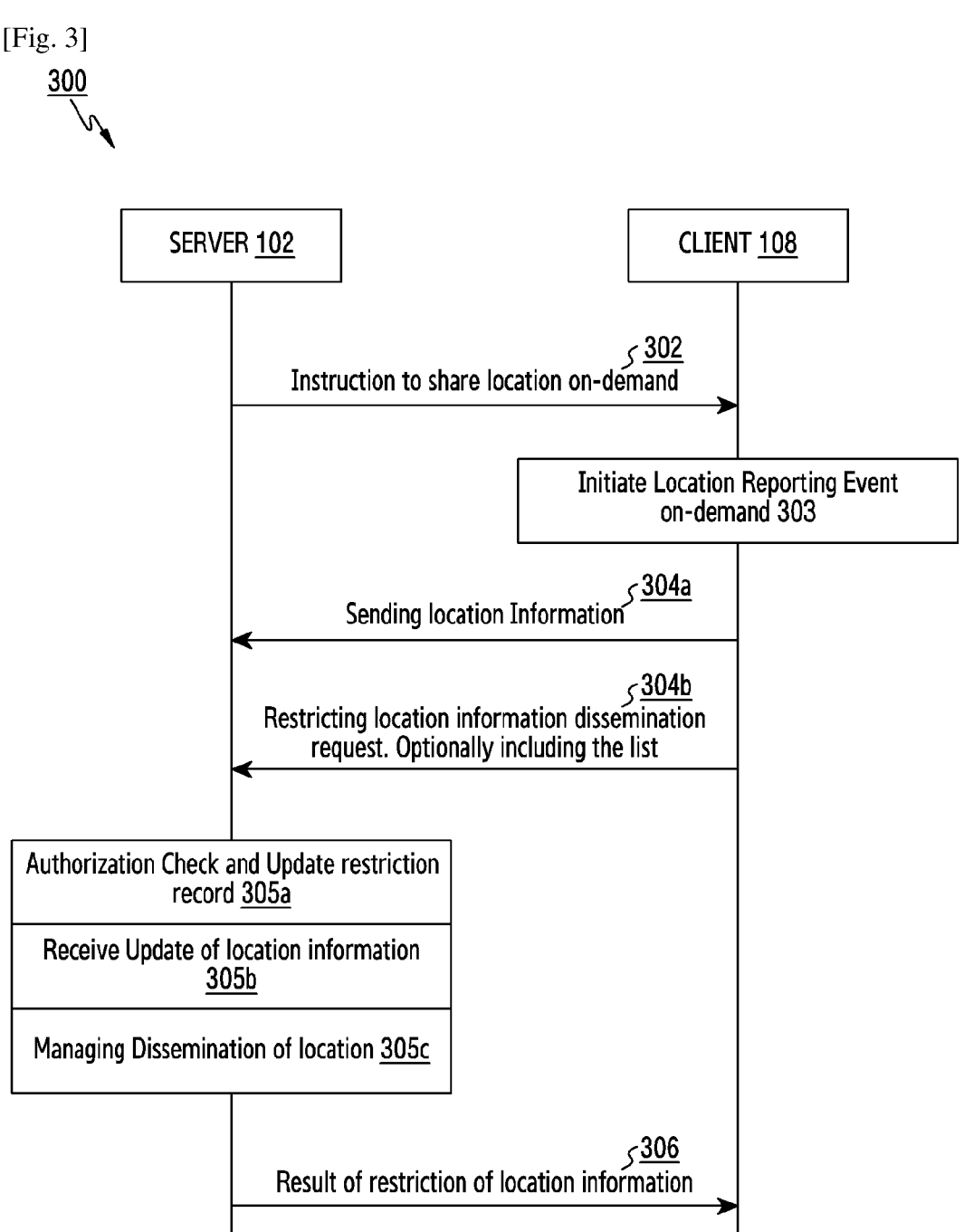

[Fig. 4]
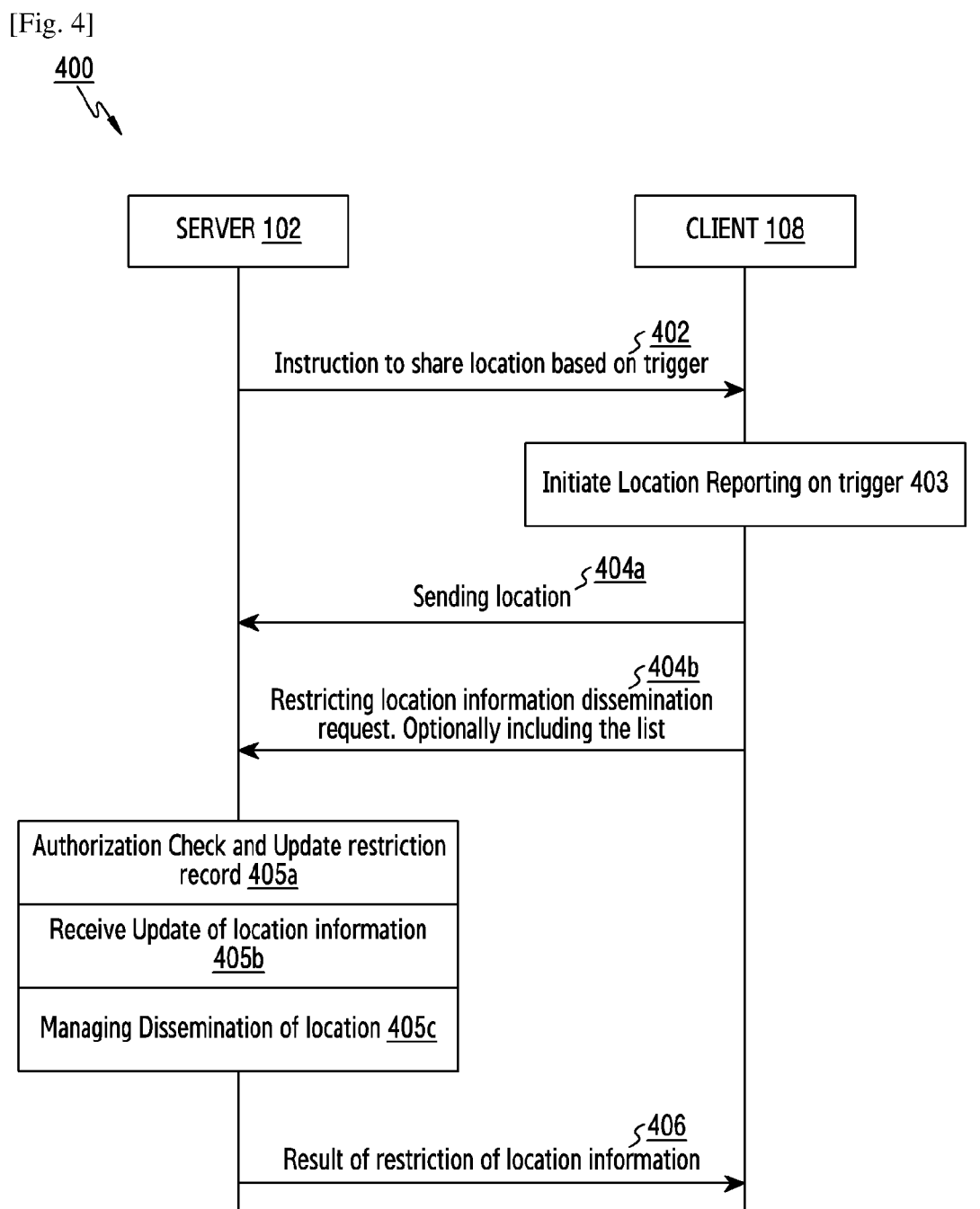

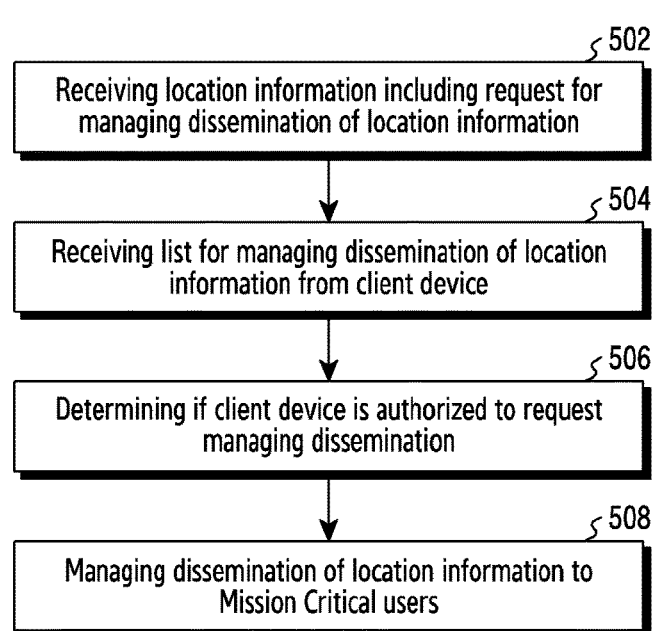

502
Receiving location information including request for managing dissemination of location information 504
Receiving list for managing dissemination of location information from client device 506
Determining if client device is authorized to request managing dissemination 508
Managing dissemination of location information to Mission Critical users

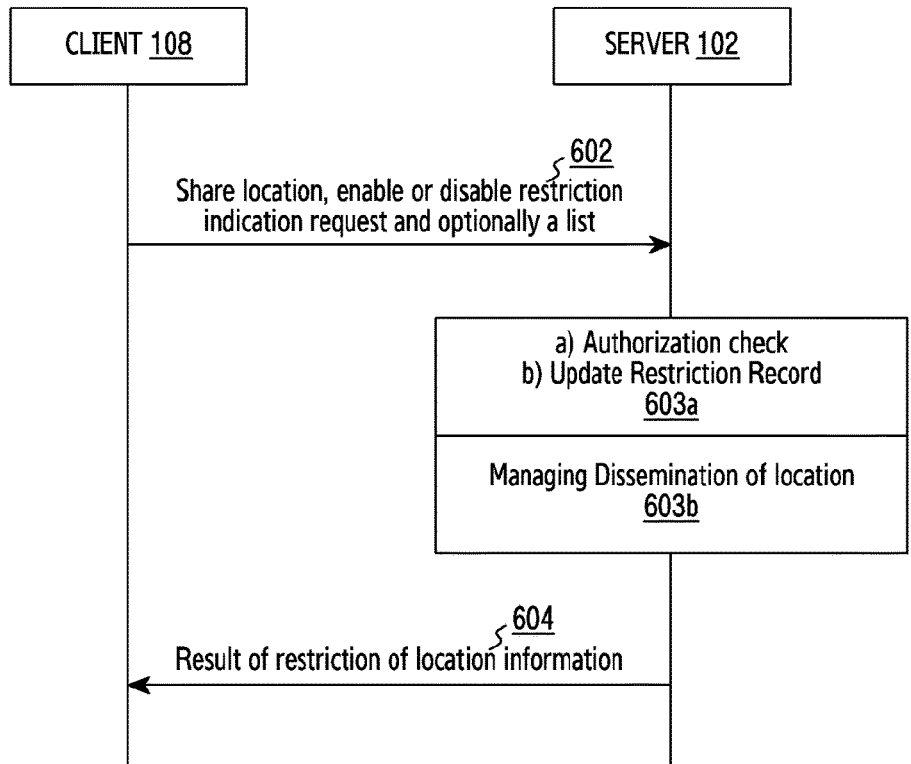

CLIENT 108                    SERVER 102

602
Share location, enable or disable restriction indication request and optionally a list a) Authorization check
b) Update Restriction Record
603a Managing Dissemination of location
603b 604
Result of restriction of location information

[Fig. 6B]
600b
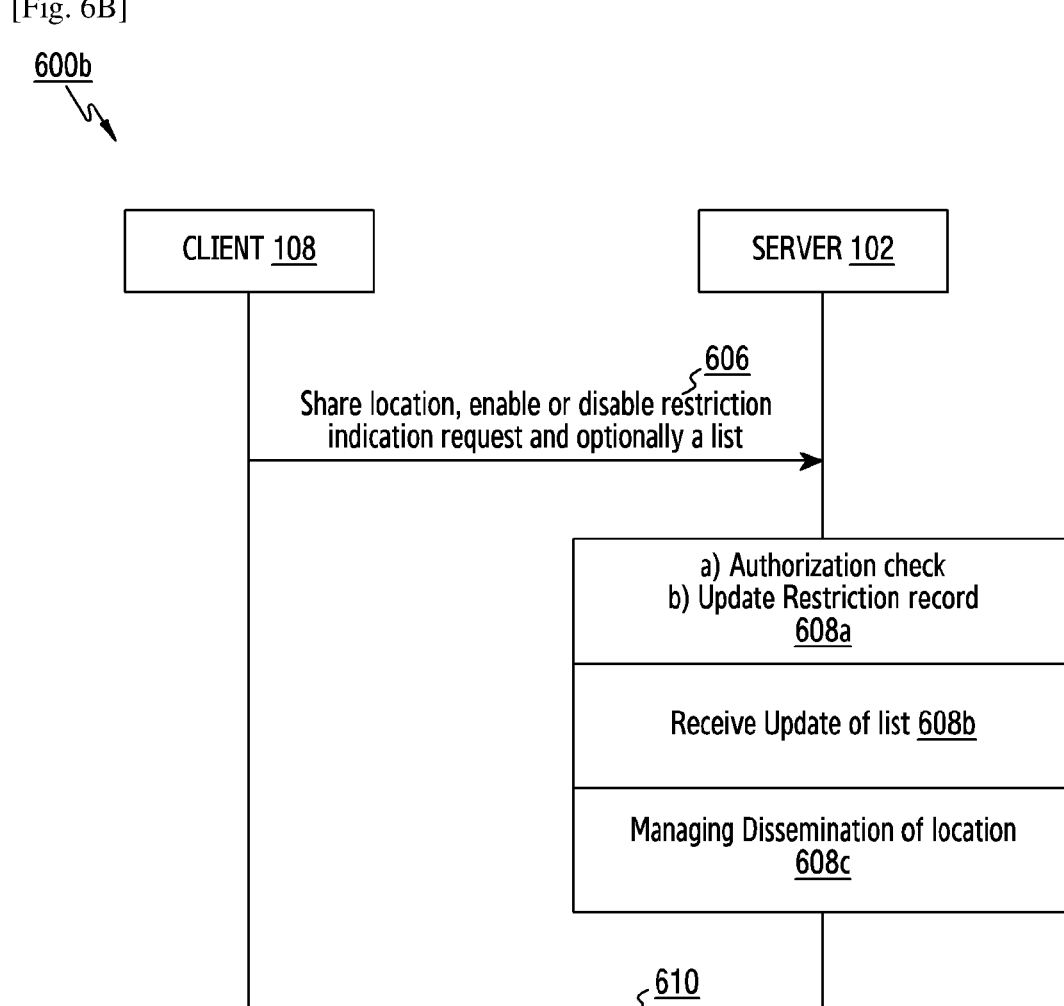

[Fig. 7]
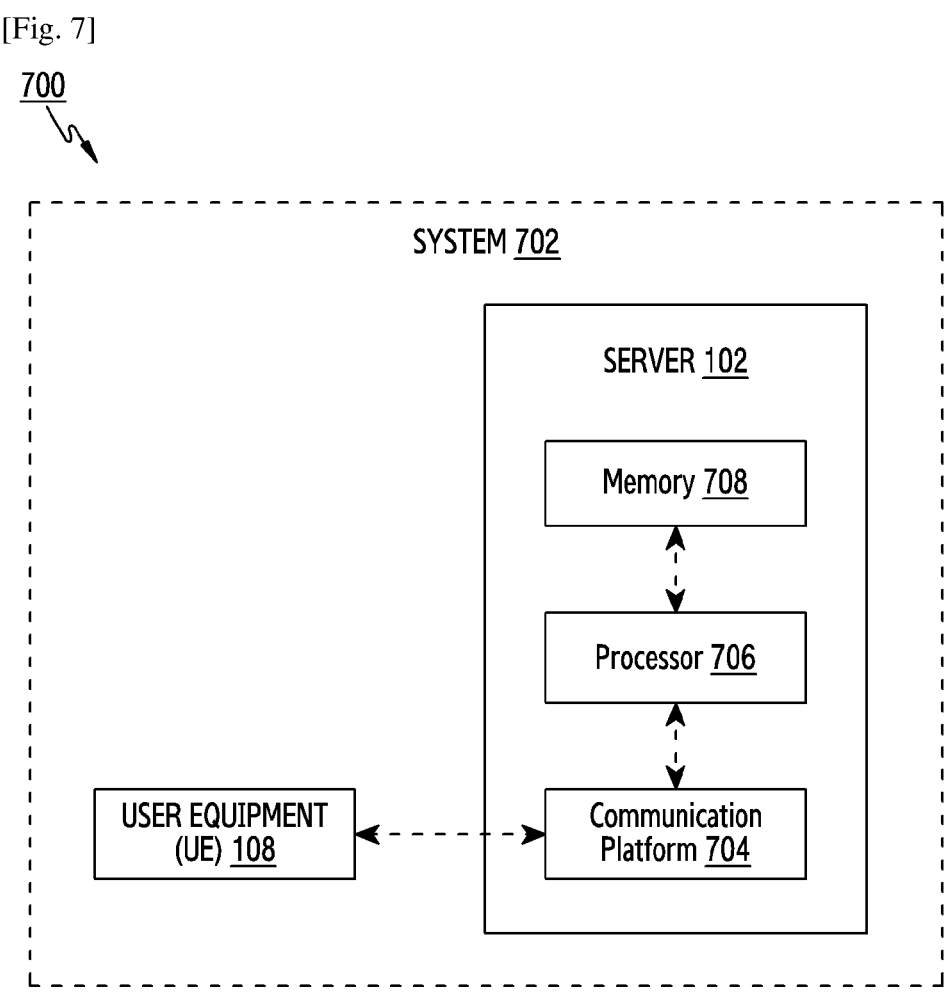

[Fig. 8]
800
808
706 Processor
824 Instructions
810 Display
812 User Input Device
708 Memory
824 Instructions
820 Communication Interface
816 Drive Unit
822 Computer Readable Mediun
824 Instructions
826 Network
[Fig. 9]
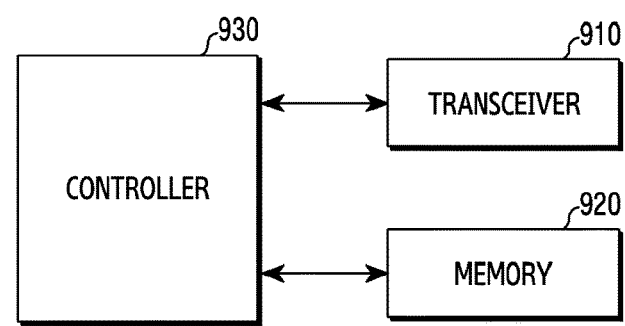
930 CONTROLLER
910 TRANSCEIVER
920 MEMORY

[Fig. 10]
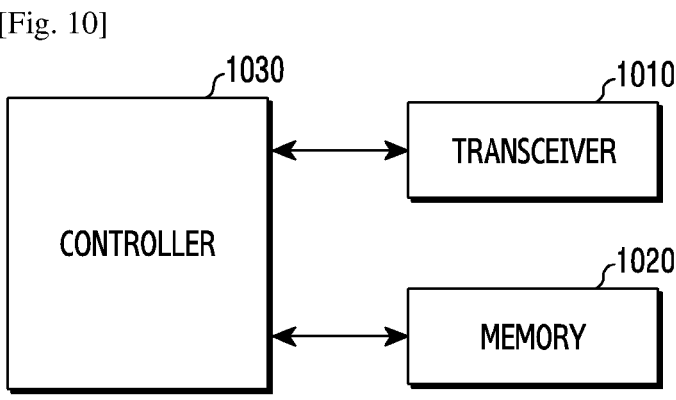

METHOD AND APPARATUS FOR MANAGING PROVISION OF LOCATION INFORMATION

PRIORITY

This application is a National Phase Entry of PCT International Application No. PCT/KR2022/009684, which was filed on Jul. 5, 2022, and claims priority to Indian patents application Nos. 202141030177 and 202141030177, which were filed on Jul. 5, 2021, and Jul. 4, 2022, respectively, the entire content of each of which is incorporated herein by reference.

TECHNICAL FIELD

The present invention relates to the managing provision (or, dissemination) of location information of a client device(s). In detail, the present invention relates to managing provision (or, dissemination) of location information of a client device(s) in mission critical services as specified in Long Term Evolution (LTE) or New Radio (NR) communication system. In particular, the present disclosure relates to system and method to restrict provision (or, dissemination) of location information of the client device.

BACKGROUND ART 5G mobile communication technologies define broad frequency bands such that high transmission rates and new services are possible, and can be implemented not only in "Sub 6 GHz" bands such as 3.5 GHZ, but also in "Above 6 GHZ" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

Hence, there is need to provide a technique for managing provision (or, dissemination) of location information to manage the privacy of the user and control the supplying of location information further to other entities.

DISCLOSURE OF INVENTION

Solution to Problem

This summary is provided to introduce a selection of concepts in a simplified format that are further described in the detailed description of the invention. This summary is not intended to identify key or essential inventive concepts of the invention, nor is it intended for determining the scope of the invention.

In an implementation, the present subject matter refers to a method performed by a server for managing dissemination of a location information of a client device. The method includes instructing a client device for sharing the location information based on one of an on-demand, a trigger; receiving the location information and a request for managing dissemination of the location information; receiving a list for managing dissemination of the location information from the client device, wherein the list is indicative a restricted, one or more Mission critical (MC) service (MCX) user for disseminating the location information of the client device; determining if the client device is authorized to request managing dissemination of the location information based on a client profile, wherein the client profile is indicative of configurations providing the client device authority to request for managing dissemination of the location information; and managing dissemination of the location information to the one or more MCX user in accordance with the list based on determination that the client device is authorized to request managing dissemination of the location information.

In an implementation, the present subject matter refers to a method implemented in a server for managing dissemination of a location information of a client device. The method includes receiving, from the client device the location information and a request for managing dissemination of the location information; receiving, from the client device a list for managing dissemination of the location information, wherein the list is indicative of a restricted one or more Mission critical (MC) service (MCX) user for disseminating the location information of the client device; determining if the client device is authorized to request managing dissemination of the location information based on a client profile, wherein the client profile is indicative of configurations providing the client device authority to request for managing dissemination of the location information; and managing dissemination of the location information to the one or more MCX users in accordance with the list based on determination that the client device is authorized to request managing dissemination of the location information.

In an implementation, the present subject matter refers to a method performed by a system implemented in a server for managing dissemination of a location information of a client device. The method includes instructing a client device for sharing the location information; receiving the location information and a request for managing dissemination of the location information; receiving a list for managing dissemination of the location information from the client device, wherein the list is indicative of a restricted one or more Mission critical (MC) service (MCX) user for disseminating the location information of the client device; determining if the client device is authorized to request managing dissemination of the location information based on a client profile, wherein the client profile is indicative of configurations providing the client device authority to request for managing dissemination of the location information; and managing dissemination of the location information to the one or more MCX user based in accordance with the list based on determination that the client is authorized to request managing dissemination of the location information.

In an implementation, the present subject matter refers to a system implemented in a server for managing dissemination of a location information of a client device. The system includes a processor configured to instruct a client device for sharing the location information. The system includes a processor configured to receive the location information and a request for managing dissemination of the location information; receive a list for managing dissemination of the location information from the client device, wherein the list is indicative of a restricted one or more Mission critical (MC) service (MCX) user for disseminating the location information of the client device; determine if the client device is authorized to request managing dissemination of the location information based on a client profile, wherein the client profile is indicative of configurations providing the client device authority to request for managing dissemination of the location information; and manage dissemination of the location information to the one or more MCX user based in accordance with the list based on determination that the client is authorized to request managing dissemination of the location information To further clarify the advantages and features of the present invention, a more particular description of the invention will be rendered by reference to specific embodiments thereof, which is illustrated in the appended drawing. It is appreciated that these drawings depict only typical embodiments of the invention and are therefore not to be considered limiting its scope. The invention will be described and explained with additional specificity and detail with the accompanying drawings.

Advantageous Effects of Invention

According to various embodiments of the disclosure, a privacy (e.g., location information) of a client device (or, user equipment or terminal) can be securely maintained by restricting dissemination (or provision) of privacy related information.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 1 illustrates a block diagram depicting an environment of implementation of the present invention, according to an embodiment of the present disclosure;

FIG. 2 illustrates a flowchart for managing dissemination of a location information, in accordance with an embodiment of the present disclosure;

FIG. 3 illustrates a signal flow process for instructing a client device to share the location information on-demand and managing dissemination of the location information, in accordance with an embodiment of the present disclosure;

FIG. 4 illustrates a signal flow process for instructing the client device to share the location information based on a trigger and managing dissemination of the location information, in accordance with an embodiment of the present disclosure;

FIG. 5 illustrates another flowchart for managing dissemination of a location information, in accordance with an embodiment of the present disclosure;

FIG. 6A illustrates a signal flow process for receiving the location information from the client device including information on managing dissemination of the location information;

FIG. 6B illustrates another signal flow process for receiving the location information and an update from the client device for managing dissemination of the location information;

FIG. 7 illustrates a system architecture in accordance with an embodiment of the present disclosure;

FIG. 8 illustrates another system architecture, in accordance with an embodiment of the present disclosure;

FIG. 9 illustrates a block diagram of a terminal (or a user equipment (UE), according to embodiments of the present disclosure; and FIG. 10 illustrates a block diagram of a server, according to embodiments of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

MODE FOR THE INVENTION

Before undertaking the detailed descriptions below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . ." or "one or more element is REQUIRED."

Unless otherwise defined, all terms, and especially any technical and/or scientific terms, used herein may be taken to have the same meaning as commonly understood by one having an ordinary skill in the art.

The present invention discloses a system and method implemented in a server for managing dissemination of a location information of a client device.

Embodiments of the present invention will be described below in detail with reference to the accompanying drawings.

In today's world, the Fifth 5th generation mobile network (5G) is considered as a decisive technology catering to wide range of services such as enhanced Mobile Broadband (eMBB), massive Machine Type Communication (mMTC) and ultra-Reliable Low Latency Communication (uRLLC). Sharing critical information such as location is a key requirement in Mission Critical (MCX) services such as surveillance, autonomous cars, telemedicine, etc. MCX services refer to broadband critical communications applications and the underlying infrastructure that supports public protection and disaster relief management. Public Safety (PS) agencies around the world, specifically first-responders such as police, firefighters, and medical services, rely on critical communications to respond to emergencies, with stringent requirements to ensure a responsive, robust, and secure network for their successful operations. In the event of a calamity, may be a man-made or natural disaster, mission critical services are to be provided with highest priority for those who are affected. For instance, a civilian with a User Equipment (UE) or a client device, such as a cell phone, stuck in a fire, floods may require emergency assistance. In such situations, the service priority must be updated in real time to allocate more radio resources to mission critical services.

Location information of a client/user is very critical information for public safety agencies and MCX services support conveyance of location information. There are numerous ways to fetch the location information of a user/client by the server i.e., receiving the location from the client or fetching the location from the network. Such location information may be distributed further to the other interested client, server, or any other entities through subscription or on-demand request or any other modes.

As the location information is a sensitive information from user/client's perspective, it requires management of how own location information is disseminated to other entities.

The location information is critical information for a client device is and subjected for privacy conditions. It is required to provide a technique to maintain the privacy for an authorized user to restrict the location information to be further distributed to any other MCX client device or server or any other entities.

FIG. 1 illustrates a block diagram depicting an environment of implementation of the present invention, according to an embodiment of the present disclosure.

Referring to FIG. 1, the present invention may be implemented between a server 102 and a client device 108.

In an embodiment, a Mission critical (MC) services (MCX) system 100 comprises the server 102 which allows users to communicate over a LTE network in mission critical environments. In an example, the server 102 may be a mission critical services (MCX) server. For the sake of brevity, the power management system 200 is hereinafter interchangeably referred to as the location management server 102.

In an embodiment, a MCX service user 112 may be using the client device 108 or a UE device 108 to communicate with the server 102 via Packet Core and an IP Multimedia Subsystem-Evolved (EPC-IMS) 110. In an example, the EPC-IMS may deliver various services such as VOIP, SMS, Video call, sharing of pictures, instant messaging, and the like. In an examples of the client device or the UE devices 108 may be a laptop, a cellular phone, a PDA (Personal Digital Assistant), a smart phone, a multimedia device, a wearable device, an Internet of Things (IoT) device and other devices which may use MC services.

Embodiments herein refer to the client device as a UE device, a UE device, a device, a MC client, a MC client device interchangeably to refer to the client device 108. The system 100 may further comprise at least one first responder device.

In an embodiment, in particular, Mission critical (MCX) services which may require the location information of the client device 108 may require obtaining and conveying of the location information to the server 102 in the network. In an example, the location information may include describing position of the client device 108. In the example, the location information may include a location reporting configuration message. In the example, the MCX services may include a Push To Talk (PTT) or a Data or a Video service. Further, in the example the client device 108 may denote a generic client which may be a PTT or a Data or a Video client.

In an embodiment, the MCX services user 112 or the server 102 may request the location information of the client device 108.

In an example the location information management procedures are described in the specification 3GPP TS 23.380 and the server 102 may request the location information from the client device 108 by configuring and re-configuring one or more location information update triggers for the client device 108 or request for the location information on-demand.

In the example, the client device 108 may send the location information update whenever a trigger condition is completed or on receiving of on-demand request from the server 102. In the example, the MCX service provides a technique for the client device 108 to send a request to the server 102 indicating a list of other MXC service user 112 with which the location information may or may not be shared by the server 102.

Alternatively, the client device 108 may send the indication in the location information report itself to the server 102. The client device 108 may provide the list for managing dissemination of the location information, wherein the list is indicative of the MCX service user 112 permitted or restricted to receive the location information. In an example, the list may be pre-defined or dynamic or based on criteria predetermined by the client device 108. In the example, the list may include a MCX service IDs of the MCX service user 112.

In an example, the client device 108 and the server 102 may play the role of local management client (LMC) and local management server (LMS) respectively.

FIG. 2 illustrates a method 200 for managing dissemination of the location information, in accordance with an embodiment of the present disclosure.

As depicted in FIG. 2, the present subject matter refers to the method 200 for managing dissemination of the location information by the client device 108 and implement in the server 102.

The method 200 may be a computer-implemented method executed, for example, by the server 102 and the client device 108. For the sake of brevity, constructional and operational features are explained in the description of FIG. 1, FIG. 2, FIG. 3, FIG. 7, and FIG. 8.

At step 202, the method 200 may include instructing the client device 108 for sharing the location information. In an embodiment, the client device 108 is in communication with the server 102. In an example, the server 102 may store a client profile related to the client device 108. In the example, the client profile is indicative of configurations providing the client device 108 authority to request for managing dissemination of the location information.

In an example, the server 102 may send an instruction to the client device 108 for sharing the location information of the client device 108 based on one of an on-demand or a trigger. In the method 200, the server 102 may send the instruction to the client device 108 on-demand and the client device 108 immediately complies to the instruction. In an alternative method 200, the server 102 may send the instruction to the client device 108 based on the trigger which may include a configuration request, a location-based request, a time-based request, a request from the one or more other MCX service user 112. In an example, the server 102 receives the request indicating requirement of location information of the client device 108. This may be understood as the trigger and the server 108 immediately initiates instructions indicating requirement to the client device 108 to share the location information based on the triggers.

At step 204, the method 200 may include the server 102 receiving the location information and a request for managing dissemination of the location information from the client device 108. In an example, the client device 108 may respond promptly to the instructions or the trigger from the server 108. In the example, the client device 108 may provide a report containing the location information to the server 102.

In the method 200, the request for managing dissemination of the location information as sent by the client device 108 to the server 102 which includes an indication to enable or a disable. The enable indication in a request indicate that the client device 108 request the server 102 to enable the restriction i.e., to restrict dissemination of the location information to the MCX service user 112. The disable indication in a request may indicate that client device 108 request the server 102 to disable the restriction i.e., to allow dissemination of the location information to the MCX service user 112.

At 206, the method 200 may include the server 102 receiving the list for managing dissemination of the location information from the client device 108. The list may include MC service IDs of the MCX service user 112. In the method, the list may be indicative of the MCX service user 112 permitted or restricted to receive the location information of the client device 108 from the server 102.

At 208, the method 200 may include the server 102 determining if the client device 108 is authorized to request managing dissemination of the location information. In the method, the server 102 may be configured to determine the client profile stored in the server 102. The client profile may provide the server 102 with configuration information about the client device 108. The configuration information may state if the client device 108 have an authority to request for managing dissemination of the location information i.e., whether the client device 108 may request the server 102 for enable or disable request for dissemination of the location information.

In the method 200, the server 102 may perform an authorization check to process the client profile corresponding to the client device 108. Upon performing the authorization check the server 108 may accordingly either accept or reject request of the client device 108 for managing dissemination of the location information. In the example, if the client profile provides configuration to the client device 108 with authority to restrict the dissemination of the location information, then the server 102 may accept the request. In other example, if the client profile provides configuration to the client device 108 with no authority to restrict the dissemination of the location information, then the server 102 may decline the request of the client device 108 to manage dissemination of the location information. In the method 200, the server 102 may send a Session Initiation Protocol (SIP) message response to the client device 108 upon determining that the client device 108 is not authorized to restrict the location information dissemination based on the client profile.

At step 210, the method 200 may include the server 102 managing dissemination of the location information to the MCX service user 112 in accordance with the list received from the client device 108. Further, the server 102 based on determination that the client device 108 is authorized to request managing dissemination of the location information may share the location information with the MCX service user 112.

In an embodiment, the method 200 may include the server 102 storing the location information and the list associated with the client device 108. In an example, the server 102 may update and store the list in a restriction record corresponding to the client device 108. In the example, the restriction record is indicative of the list of MCX service user 112 restricted to receive the location information of the client device.

In another embodiment, the method 200 may include the server 102 receiving an updated list for managing dissemination of the location information from on the client device 108. In an example, the client device 108 may send the updated list to the server 102. In the example, the updated list may include addition or removal of the MCX service user 112. The client device 108 may dynamically restrict or permit the MCX service user 112 at different instance. In the example, the client device 108 may use the existing list sent along the location information to add or remove the MCS service user 112.

In another embodiment, the method 200 may include the server 102 sending the result of the request for restricting the location Information dissemination in the location information response to the client device 108.

In an exemplary example of information flow of the location information between the server 102 and the client device 108 is represented in the table 1 below. Table 1 below describes the information flow from the client device 108 to the server 102 for restricting the location information dissemination further.

TABLE 1

| Information element | Status | Description |
| --- | --- | --- |
| MC service ID | M | Identity of the requesting MC service user (e.g. MCPTT ID, MCVideo ID, MCData ID) |

TABLE 1-continued

| Information element | Status | Description |
|---|---|---|
| Restrict Location Information Dissemination | M | Indicates to enable or disable the location information dissemination |
| List of users for location information dissemination (NOTE) | O | Indicates the list of users based on the role of the users or indicated in the list or any is applicable for restriction of the location information dissemination. |

In another exemplary example of information flow of the location information between the server 102 and the client device 108 is represented in the table 2 below. Table 2 below describes the information flow from the server 102 to the client device 108 for response to restricting the location information dissemination request. A success response is returned on completing the application of the request indicating restriction to enable or disable of the location information distribution. In case, the request indicating restriction to enable or disable is unsuccessful it return an error response.

TABLE 2

| Information element | Status | Description |
|---|---|---|
| MC service ID | M | Identity of the requested MC service user (e.g. MCPTT ID, MCVideo ID, MCData ID) |
| Restrict Location Information Dissemination status | M | Indicates the result of restricting the location information dissemination |

FIG. 3 illustrates a signal flow process 300 for sending instruction based on-demand to the client device 108 by the server 102 to share the location information and managing dissemination of the location information, in accordance with an embodiment of the present disclosure. For the sake of brevity construction and operational features of the signal flow process 300 are explained in FIG. 2.

At step 302, the server 102 may instruct the client device 108 to share the location information. In the signal flow process 300 the client device 108 may notify the user and request for permission to share the location information with the server 102.

At step 303, the signal flow process 300 may include the client device 108 initiating location reporting based on-demand request of the server 108.

At step 304a, the signal flow process 300 may include the server 102 receiving the location information from the client device 108.

At step 304b, the signal flow process 300 may include the server 102 receiving the request indicating location information dissemination independent of the location information. Additionally, at step 304b the signal flow process 300 may optionally include the list.

At step 305a, the signal flow process 300 may include the server 102 performing the authorization check. The server 102 may either update the restriction record with the list received or may create the restriction record with the list received if the client device 108 is sending the list for the first time. As part of the authorization check, the server 102 may determine that the client profile of the client device 108 is configured to request either of enable or disable of the location information dissemination. Further, the server 102 may update the restriction record with the list which includes the MCX service user 112 restricted to receive the location information of the client device 108. In the signal flow process 300, the client device 108 provides the list in response to each of the on-demand instruction received from the server 102 to share the location information.

At step 305b, the signal flow process 300 may include the server 102 managing the dissemination of the location information to the MCX service user 112 based on the request and the list.

At step 306, the signal flow process 300 may include the server 102 sending a message to the client device 108 in response to the location information report. The message may indicate the result of restriction of location information.

FIG. 4 illustrates a signal flow process 400 for instructing the client device 108 to share the location information based on the trigger and managing dissemination of the location information. For the sake of brevity construction and operational features of the signal flow process 300 are explained in FIG. 2.

At step 402, signal flow process 400 may include the server 102 instructing the client device 108 to share the location information based on the trigger. The client device 108 optionally may notify the user and request for permission to share the location information with the server 102. In the signal flow process 400 the trigger may include at least one of the configuration request, the location-based request, the time-based request, the request from the one or more other MCX service user 112.

At step 403, the signal flow process 400 may include the client device 108 initiating location reporting based on the trigger.

At step 404a, the signal flow process 400 may include the server 102 receiving the location information from the client device 108.

At step 404b, the signal flow process 400 may include the server 102 receiving the request indicating location information dissemination independently from the location information. Additionally, at step 404b the signal flow process 400 may optionally include the list.

At step 405a, the signal flow process 400 may include the server 102 performing the authorization check. The server 102 upon determining that the client profile of the client device 108 is configured to request either enable or disable the location information dissemination, update the restriction record with the list including the MCX service user 112 restricted to receive the location information of the client device 108.

In this embodiment, at step 405b, the signal flow process 400 may include the client device 108 sending an update in the list, in response to the existing location information reporting i.e., the list shared with the location information reporting may be updated instead of sending a new list of the MXC service user 112 every time. The client device 108 may send the subsequent request for restricting the distribution of location information by indicating to enable or disable or combination of both for subset of MCX service users 112 to update/modify the existing restriction record.

At step 405c, the signal flow process 400 may include the server 102 managing the dissemination of the location information to the MCX service user 112 based on the request and the list or updated list.

At step 406, the signal flow process 400 may include the server 102 sending a message to the client device 108 in response to the location information report. The message may indicate the result of restriction of location information.

In an exemplary example of implementation of the method 200, the signal flow process 300 and the signal flow process 400 may include the following:

In the example, the server 102 may be referred to as a MCPTT server 102. The MCPTT server 102 needs to distinguish between the following SIP MESSAGE request for originations and terminations.

A SIP MESSAGE requests routed to the participating MCPTT function as a result of initial filter criteria with the Request-URI set to the public service identity of the participating MCPTT function and containing a Content-Type header field set to "application/vnd.3gpp.mcptt-info+xml" and including an XML body containing a <mcpttinfo> root element containing a <mcptt-Params> element containing an <anyExt> element with the <request-type> element set to a value of "restrict-location-information-dissemination-request". Such requests are known as "SIP MESSAGE request for restricting the location information dissemination for participating MCPTT function" in the procedures referred to the present invention. A warning texts that are defined for the Warning header field when a Warning header field is included in a response to a SIP MESSAGE request In the example, upon receiving a request from the client device 108 to send a request to manage dissemination of the location information, if the <allow-request-restrict-location-information-dissemination> element of the <ruleset> element is not present in the client profile or referred in implementation as the MCPTT user profile document, see the MCPTT user profile document in 3GPP TS 24.384 or is set to a value of "false", the client device 108 may display the message to the user and shall exit this procedure.

In the example, upon receiving a request from the client device 108 to send a request to manage dissemination of the location information, if, the client device 108 generate a SIP MESSAGE request in accordance with 3GPP TS 24.229 and IETF RFC 3428 with the clarifications given below. The client device may:

1) Include a Request-URI set to the public service identity identifying the originating participating MCPTT function serving the client device 108;

2) Include the ICSI value "urn:urn-7:3gpp-service.ims.icsi.mcptt" (coded as specified in 3GPP TS 24.229), in a P-Preferred-Service header field according to IETF RFC 6050;

3) Include an Accept-Contact header field with the g.3gpp.icsi-ref media feature tag containing the value of "urn:urn-7:3gpp-service.ims.icsi.mcptt" along with the "require" and "explicit" header field parameters according to IETF RFC 3841;

4) Include a P-Preferred-Identity header field in the SIP MESSAGE request containing a public user identity as specified in 3GPP TS 24.229;

5) Include an application/vnd.3gpp.mcptt-info+xml MIME body with the <mcpttinfo> element containing the <mcptt-Params> element with:

a) an <mcptt-request-uri> element containing the MCPTT ID of the client device 108;

b) the <restrict-location-info-dissemination-ind> element set to a value of "true" if the client device 108 has requested for restricting the distribution of location information. Otherwise, shall set to a value of "false";

c) the <mcptt-client-id> element set to the MCPTT client ID of the originating MCPTT client device 108; and d) if the MCPTT client device 108 needs to include an active functional alias in the SIP MESSAGE request, the <functional-alias-URI> set to the URI of the used functional alias;

6) if the potential targets are to be used based on the role or selected users to restrict the distribution of location information further, may insert in the SIP MESSAGE request according to rules and procedures of IETF RFC 4826 a MIME resource-lists body with:

a) the MCPTT IDs of the potential target MCPTT users; and

7) Send the SIP MESSAGE request according to rules and procedures of 3GPP TS 24.229.

In the example implementation, the participating MCPTT function has procedures to receive a restrict location information dissemination request from the UE.

In the example implementation, upon receipt of a "SIP MESSAGE request for restricting the location information dissemination for participating MCPTT function", the participating MCPTT function:

1) If unable to process the request due to a lack of resources or a risk of congestion exists, may reject the SIP MESSAGE request with a SIP 500 (Server Internal Error) response. The participating MCPTT function may include a Retry-After header field to the SIP 500 (Server Internal Error) response as specified in IETF RFC 3261 and skip the rest of the steps;

2) May determine the MCPTT ID of the MCX service user 112 from the public user identity in the P-Asserted-Identity header field of the SIP MESSAGE request; The MCPTT ID of the MCX service user 112 is bound to the public user identity at the time of service authorisation.

a) if the participating MCPTT function cannot find a binding between the public user identity and an MCPTT ID or if the validity period of an existing binding has expired, then the participating MCPTT function shall reject the SIP MESSAGE request with a SIP 404 (Not Found) response with the warning text set to "141 user unknown to the participating function" in a Warning header field, and shall not continue with any of the remaining steps;

3) If the request contains the <request-type> element set to a value of "restrict-location-information-dissemination-request", and the <allow-request-restrict-location-information-dissemination> element of the <ruleset> element is not present in the client profile or the MCPTT client profile document, referring to the MCPTT user profile document in 3GPP TS 24.384 or is set to a value of "false", shall reject the SIP MESSAGE request with a SIP 403 (Forbidden) response including warning text set to "xyz user not authorized to request for restricting the location information dissemination" in a Warning header field, and shall not continue with the rest of the steps in this subclause;

4) Based on the received <restrict-location-info-dissemination-ind> indication, the server 102 updates the restriction record cache of the client device 108. If the server 102 does not have the restriction record cached for the location information dissemination, then just store the restriction record accordingly. The cached information may include the list of MCX service user 112 if provided in the incoming SIP MESSAGE request else it is applicable for all the MCX service user 112.

5) Shall generate a SIP 200 (OK) response as specified in 3GPP TS 24.229 with the follow clarifications:

a) shall include the public user identity in the P-Asserted-Identity header;

6) Shall send the SIP 200 (OK) response to the MCPTT client according to 3GPP TS 24.229.

In the example, if the participating MCPTT function receives a SIP request containing 1) a Content-Type header field set to "application/vnd.3gpp.mcptt-location-info+xml"; and 2) an application/vnd.3gpp.mcptt-location-info+xml MIME body with a <Report> element included in the <location-info> root element;

Then in the example implementation, the participating MCPTT function may authorise the location information based on the MCPTT ID received. If the client device 108 is authorised to send a location report the participating MCPTT function:

1) Send the reported location information to the MCPTT service user 112 those who have requested for the location information or subscribed to the location information. Otherwise, the location information shall not be shared with any of the interested MCPTT service user 112 or list of the MCPTT service user 112 if requested.

FIG. 5 illustrates another flowchart for managing dissemination of the location information, in accordance with an embodiment of the present disclosure.

As depicted in FIG. 5, the present subject matter refers to the method 500 for managing dissemination of the location information by the client device 108 and implement in the server 102.

The method 500 may be a computer-implemented method executed, for example, by the server 102 and the client device 108. For the sake of brevity, constructional and operational features are explained in the description of FIG. 1, FIG. 7, and FIG. 8.

At step 502, the method 500 may include receiving the location information. In an example, the server 102 may receive the location information from the client device 108.

In the method 500, the client device 108 may include an enable or a disable indication in the location information request (i.e. Location information reporting). The enable indication in a request may indicate that the client device 108 request the server 102 to enable the restriction i.e., to restrict dissemination of the location information to the MCX service user 112. In another example, the disable indication in a request may indicate that client device 108 request the server 102 to disable the restriction i.e., to allow dissemination of the location information to the MCX service user 112.

At 504, the method 500 may include the server 102 receiving the list for managing dissemination of the location information from the client device 108. In an example, the list may include MC service IDs of the MCX service user 112. In the example, the list may be indicative of the MCX service user 112 permitted or restricted to receive the location information of the client device 108 from the server 102.

At 506, the method 500 may include the server 102 determining if the client device 108 is authorized to request managing dissemination of the location information. In an example, the server 102 may be configured to determine the client profile stored in the server 102. In the example, the client profile may provide the server 102 with configuration information about the client device 108. The configuration information may state if the client device 108 have an authority to request for managing dissemination of the location information i.e., whether the client device 108 may request the server 102 for enable or disable request for dissemination of the location information.

In the example, the server 102 may perform an authorization check to process the client profile corresponding to the client device 108.

At step 508, the method 500 may include the server 102 managing dissemination of the location information to the MCX service user 112 in accordance with the list received from the client device 108. Further, the server 102 based on determination that the client device 108 is authorized to request managing dissemination of the location information may share the location information with the MCX service user 112.

In an embodiment, the method 500 may include the client device 108 each time providing separate request i.e., to enable or disable the restriction to disseminate the location information and the list including the MCX service user 112 with each request. The client device 108 may also send an update to the list including the MCX service user 112, for the existing location information instead of sending a new list every time. In an example, updating the list by the client device 108 may include modifying the permission or restriction to the MCX service user 112, removing, adding the MCX service user 112 from the existing list already shared with the server 102.

In an exemplary example of information flow of the location information between the server 102 and the client device 108 is represented in the table 3 below.

TABLE 3

| (A) Information element | (B) Status | (C) Description |
|---|---|---|
| Set of MCX service IDs of the MCX service user 112 | M | Set of identities of the reporting MC service user on the client device 108 for e.g., MCPTTID, MCVideo ID, MCData ID |
| Functional alias(es) | O | Functional alias that corresponds to the MCX service ID. |
| MC service UE label | O | Generic name of the reporting client device 108 |
| Triggering event | M | Identity of the event that triggered the sending of the report |
| Location Information | M | Location information of the client device |
| Restrict Location Information Dissemination | O | Indicates request to enable or disable the location information dissemination |
| List of users for location information dissemination | O | Indicates the list of MCX service user 112 based on the role or indicated in the list or any is applicable for restriction of the location information dissemination. |

In the table 3, each functional alias corresponds to the individual MC service IDs.

In accordance with the table 3, the location information may include multiple sets of elements for the client device. In an example, the following elements may be necessarily included in the location information: time of measurement and optional accuracy. In the example, the following elements shall be optional (configurable) present in the location information: longitude, latitude, speed, bearing, altitude, ECGI, MBMS SAIs, with at least one of them provided.

In accordance with the table 3, if the restrict on the location information dissemination is not present then restricting of the location information dissemination is not applicable to any MCX service user 112.

FIG. 6A illustrates a signal flow process 600a for receiving the location information including the request for managing dissemination of location information from the client device 108. For the sake of brevity construction and operational features of the signal flow process 600a are explained in FIG. 5.

At step 602, the signal flow process 600a may include the client device 108 sharing the location information report with the server 102. The location information report may include, the location information, the enable and disable indication and the list to manage dissemination of the location information.

At step 603a, the signal flow process 600a may include the server 102 performing the authorization check. The server 102 may either update the restriction record or may create the restriction record with the list received if the client device 108 is sending the list for the first time and updating the restriction record. As part of the authorization check, the server 102 may determine that the client device 108 is authorized to request the managing dissemination of the location information.

At step 603b, the signal flow process 600a may include the server 102 managing the dissemination of the location information to the MCX service user 112 based on the request and the list.

At step 604, the server 102 may send a result of restriction of location information. The server 102 may send a message to the client device 108 in response to receiving the location information report. If the authorization check is successfully validated, then the server 102 may send a response indicative of successfully storing the list or update of the list. Else, the server 102 may send a response indicative of non-authorization of the client device 108 to request for managing dissemination of the location information.

FIG. 6B illustrates another signal flow process 600b for receiving the location information including request for managing dissemination of location information. For the sake of brevity construction and operational features of the signal flow process 600b are explained in FIG. 5.

At step 606, the signal flow process 600b may include the client device 108 sharing the location information report with the server 102. The location information report may include, the location information, the enable and disable indication and the list to manage dissemination of the location information.

At step 608a, the signal flow process 600b may include the server 102 performing the authorization check. The server 102 may either update the restriction record or may create the restriction record with the list received if the client device 108 is sending the list for the first time and updating the restriction record. As part of the authorization check, the server 102 may determine that the client device 108 is authorized to request the managing dissemination of the location information.

At step 608b, the signal flow process 600b may include the client device 108 may always specifies whether to enable or disable the restriction to distribute the location information to the MCX service user 112 mentioned in the list. In the signal flow process 600b, the client device 108 may send the subsequent request for restricting the distribution of location information by indicating to enable or disable or combination of both for subset of MCX service user 112 to update/modify existing restriction record.

At step 608c, the signal flow process 600b may include the server 102 managing the dissemination of the location information to the MCX service user 112 based on the request and the list.

At step 610, the server 102 may send a result of restriction of location information to the client device 108.

In an exemplary example of implementation of the method 500, the signal flow process 600a and the signal flow process 600b may include the following.

In the example, the client device 108 e.g., the MCPTT client needs to send a SIP request for reasons such as a SIP MESSAGE request containing an MBMS listening report, the client device 108 may:
1) Include an application/vnd.3gpp.mcptt-location-info+xml MIME body and in the <location-info> root element the MCPTT client shall include:
   a) a <Report> element and if the Report was triggered by the location information request include the <ReportID> attribute set to the value of the <RequestID> attribute in the received Request;
   b) <TriggerId> child elements, where each element is set to the value of the <Trigger-Id> attribute associated with the trigger that have fired; and
   c) the location reporting elements corresponding to the triggers that have fired;
2) Set the minimumReportInterval timer to the minimumReportInterval time and start the timer; and
3) Reset all triggers.

In the example, the client device 108 may not need to send a SIP request for reasons such as the client device 108 may generate a SIP MESSAGE request in accordance with 3GPP TS 24.229 and IETF RFC 3428. The client device 108 may:
1) Include in the Request-URI, the SIP URI received in the P-Asserted-Identity header field in the received SIP MESSAGE request for location report configuration;
2) Include a Content-Type header field set to "application/vnd.3gpp.mcptt-location-info+xml";
3) Include an application/vnd.3gpp.mcptt-location-info+xml MIME body and in the <location-info> root element include:
   a) a <Report> element and if the Report was triggered by the location information request include the <ReportID> attribute set to the value of the <RequestID> attribute in the received Request;
   b) a <TriggerId> child element set to the value of each <Trigger-Id> value of the triggers that have fired;
   c) the location information elements corresponding to the triggers that have fired; and
   d) may include the <restrict-location-info-dissemination-ind> element set to a value of "true" if the client device 108 has requested for restricting the distribution of the location information. Otherwise, shall set to a value of "false";
4) If the <restrict-location-info-dissemination-ind> element is included and the MCX service user 112 are provided based on the role or selected MCX service user 112 to restrict the distribution of the location information further, may insert in the SIP MESSAGE request according to rules and procedures of IETF RFC 4826 an application/resource-lists+xml MIME body with:

a) the MCPTT IDs of the MCX service user 112; and b) shall include a Content-Type header field set to "application/resource-lists+xml";

5) Include an Accept-Contact header field with the media feature tag g.3gpp.mcptt along with parameters "require" and "explicit" in accordance with IETF RFC 3841;

6) Set the minimumReportInterval timer to the minimum-ReportInterval time and start the timer;

7) Reset all triggers; and

8) Send the SIP MESSAGE request as specified in 3GPP TS 24.229.

In the example implementation, the participating MCPTT function has procedures to receive a location information report from the UE.

In the example implementation, the participating MCPTT function receives a SIP request containing:

1) A Content-Type header field set to "application/vnd.3gpp.mcptt-location-info+xml"; and 2) An application/vnd.3gpp.mcptt-location-info+xml MIME body with a <Report> element included in the <location-info> root element;

In the example implementation then the participating MCPTT function may authorise the location information report based on the MCPTT service ID received. If the client deice 108 is authorised to send the location information report to the participating MCPTT function:

1) If the request contains the <restrict-location-info-dissemination-ind> element and the <allow-request-restrict-location-information-dissemination> element of the <ruleset> element is not present in the client profile or the MCPTT user profile document, referring to the MCPTT user profile document in 3GPP TS 24.384 or is set to a value of "false", may include the warning text set to "xyz user not authorized to request for restricting the location information dissemination" in a Warning header field in a response for the SIP MESSAGE request;

2) If the request contains the <restrict-location-info-dissemination-ind> element, the server 102 updates the restriction record cache of the requesting client device 108. If the server 102 does not have the restriction record cached for the location information dissemination of the requesting client device 108 before, then the server 102 may store the restriction record for that client device 108 accordingly. The cached information includes the list of MCX service user 112 if provided in the incoming SIP MESSAGE request else it is applicable for all the MCX service user 112.

3) shall send the reported location information to other MCPTT users those who have requested for the location information or subscribed to the location information if the user of the reported location information has not enabled the restriction on dissemination of location information further to all the users or list of the users if requested. Otherwise, the location information shall not be shared with any of the interested MCPTT users or list of the users if requested;

4) shall generate a SIP 200 (OK) response as specified in 3GPP TS 24.229 with the follow clarifications:

a) shall include the public user identity in the P-Asserted-Identity header; and 5) shall send the SIP 200 (OK) response to the MCPTT client according to 3GPP TS 24.229.

According to an embodiment, an example implementation is presented. In the example the MCX service i.e., a MCPTT is provided. The similar implementation may be implied for other MCX services such as MCVideo and MCData.

In the example, the server 102 may be the MCPTT server in the present example may be able to distinguish between the following SIP MESSAGE request for originations and terminations. The SIP MESSAGE requests routed to the participating MCPTT service as a result of initial filter criteria with the Request-URI set to the public service identity of the participating MCPTT service and containing a Content-Type header field set to "application/vnd.3gpp.mcptt-info+xml" and including an XML body containing a <mepttinfo> root element containing a <mcptt-Params> element containing an <anyExt> element with the <request-type> element set to a value of "restrict-location-information-dissemination-request". In the example, such requests are known as "SIP MESSAGE request for restricting the location information dissemination for participating MCPTT function". In the example, the SIP message may also include warning text stating that the user may not be authorized to request for restricting the location information dissemination.

In the example, upon the server 102 instructing the client device 108 to send the location information, the client device 108 may send the request for managing dissemination of location information. If the <allow-request-restrict-location-information-dissemination> element of the <ruleset> element is not present in the client profile of the client device 108, reference to the MCPTT user profile document in 3GPP TS 24.384 or is set to a value of "false", the client device shall display the SIP message to a user of the client device 108 and may exit the procedure.

In the example, upon the client device 108 receiving the instruction from the server 102 to send the location information dissemination request, the client device may generate a SIP MESSAGE request in accordance with 3GPP TS 24.229 and IETF RFC 3428 with the clarifications given below. The client device 108 may:

1. Include a Request-URI set to the public service identity identifying the originating participating MCPTT function serving the client device 108;

2. Include the ICSI value "urn:urn-7:3gpp-service.ims.icsi.mcptt" (coded as specified in 3GPP TS 24.229), in a P-Preferred-Service header field according to IETF RFC 6050;

3. Include an Accept-Contact header field with the g.3gpp.icsi-ref media feature tag containing the value of "urn:urn-7:3gpp-service.ims.icsi.mcptt" along with the "require" and "explicit" header field parameters according to IETF RFC 3841;

4. Include a P-Preferred-Identity header field in the SIP MESSAGE request containing a public user identity as specified in 3GPP TS 24.229;

5. Include an application/vnd.3gpp.mcptt-info+xml MIME body with the <mcpttinfo> element containing the <mcptt-Params> element with:

a) an <mcptt-request-uri> element containing the MCPTT ID of the client device 108;

b) the <restrict-location-info-dissemination-ind> element set to a value of "true" if the client device has requested for restricting the distribution of location information. Otherwise, shall set to a value of "false";

c) the <mcptt-client-id> element set to the MCPTT client ID of the originating MCPTT client device 108; and d) if the client device 108 needs to include an active functional alias in the SIP MESSAGE request, the <functional-alias-URI> set to the URI of the used functional alias; and 6. Send the SIP MESSAGE request according to rules and procedures of 3GPP TS 24.229.

In the implementation example, the participating MCPTT function has procedures to receive the location information, the request for managing dissemination of the location information and the list from the client device 108.

In the implementation example, upon receipt of a "SIP MESSAGE request for restricting the location information dissemination for participating MCPTT function", the participating MCPTT function:

1) If unable to process the request due to a lack of resources or a risk of congestion exists, may reject the SIP MESSAGE request with a SIP 500 (Server Internal Error) response. The participating MCPTT function may include a Retry-After header field to the SIP 500 (Server Internal Error) response as specified in IETF RFC 3261 and skip the rest of the steps;

2) Shall determine the MCPTT ID of the calling user from the public user identity in the P-Asserted-Identity header field of the SIP MESSAGE request;

NOTE: The MCPTT ID of the calling user is bound to the public user identity at the time of service authorisation.

2a) If the participating MCPTT function cannot find a binding between the public user identity and an MCPTT ID or if the validity period of an existing binding has expired, then the participating MCPTT function shall reject the SIP MESSAGE request with a SIP 404 (Not Found) response with the warning text set to "141 user unknown to the participating function" in a Warning header field, and shall not continue with any of the remaining steps;

3) If the request contains the <request-type> element set to a value of "restrict-location-information-dissemination-request", and the <allow-request-restrict-location-information-dissemination> element of the <ruleset> element is not present in the MCPTT user profile document (see the MCPTT user profile document in 3GPP TS 24.384) or is set to a value of "false", shall reject the SIP MESSAGE request with a SIP 403 (Forbidden) response including warning text set to "xyz user not authorized to request for restricting the location information dissemination" in a Warning header field, and shall not continue with the rest of the steps.

4) Based on the received <restrict-location-info-dissemination-ind> indication, the server 102 updates cache of restriction record of the requesting client device 108. If the server 102 does not have the restriction record cached for location information dissemination of the requesting MC service client before, then just store the restriction record for the client device 102 accordingly.

5) Generate a SIP 200 (OK) response as specified in 3GPP TS 24.229 with the following:

a) shall include the public user identity in the P-Asserted-Identity header;

6) Send the SIP 200 (OK) response to the client device according to 3GPP TS 24.229.

In the implementation example, if the participating MCPTT function receives a SIP request containing:

1) A Content-Type header field set to "application/vnd.3gpp.mcptt-location-info+xml"; and 2) An application/vnd.3gpp.mcptt-location-info+xml MIME body with a <Report> element included in the <location-info> root element;

Then in the example, the participating MCPTT function may authorise the request and the location report based on the MCPTT ID received. If the client device 108 is authorised to send a location report the participating MCPTT function:

1) Send the location information reported by the client device 108 to the other MCPTT service user 112 requesting for the location information or subscribed to the location information. Otherwise, the location information shall not be shared with other MCPTT service user 112.

FIG. 7 illustrates a representative architecture 700 to provide tools and implementation environment described herein for a technical realization of a system 702 for managing dissemination of the location information through interaction of the server 102 and the client device 108. FIG. 7 is merely a non-limiting example, and it will be appreciated that many other architectures may be implemented to facilitate the functionality described herein. The architecture 700 may be executing on hardware such as the server 102 and the client device 108 of FIG. 7 that includes, among other things, processors, memory, and various application-specific hardware components.

The architecture 700 may include an operating-system, libraries, frameworks or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

A hardware interface layer includes libraries which may include system libraries such as filesystem (e.g., C standard library) that may provide functions such as memory allocation functions, string manipulation functions, mathematic functions, and the like. In addition, the libraries may include API libraries such as audio-visual media libraries (e.g., multimedia data libraries to support presentation and manipulation of various media format such as MPEG4, H.264, MP3, AAC, AMR, JPG, PNG), database libraries (e.g., SQLite that may provide various relational database functions), web libraries (e.g., WebKit that may provide web browsing functionality), and the like.

A middleware may provide a higher-level common infrastructure such as various graphic user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Further, the architecture 700 includes the system 702 implemented in the server 102 and the client device 108. The server 102 may include the communication platform 704 in communication with the client device 108. The server 106 may include the processor 706 in communication with the communication platform 704 and operatively coupled with a memory 708. The processor 706 is configured to manage dissemination of the location information.

In an embodiment, the system 702 for managing dissemination of the location information from the client device 108 is disclosed, according to an embodiment of the present disclosure. For the sake of brevity, the system 702 for managing dissemination of the location information is hereinafter interchangeably referred to as the system 702.

In an embodiment, the server 102 is configured to establish a communication with the client device 108. In an example, the processor 706 is configured to instruct the client device 108 for sharing the location information. In the example, the instruction to the client device 108 for sharing the location information may be based on one of an on-demand or a trigger. The trigger may include at least one of a configuration request, a location-based request, a time-based request, a request from the one or more other clients.

Further, the processor 706 is configured to receive the location information and the request for managing dissemination of the location information from the client device 108. In an example, the request may include either of a enable request or a disabled request. In the example, the enable request may be indicative of a restriction on dissemination of the location information to the one or more MCX user 112. In the example, a disabled request may be indicative of allowing dissemination of the location information to the one or more MCX user 112.

In an embodiment, the processor 706 is configured to receive the list for managing dissemination of the location information from the client device 108. In an example, the list is indicative of one of a permitted, a restricted MCX user 112 for disseminating the location information of the client device 108.

The processor 706 is configured to determine if the client device 108 is authorized to request managing dissemination of the location information. In an example, the processor 706 performs an authorization check based on a client profile. In the example, the client profile may be indicative of configurations providing the client device 108 authority to request for managing dissemination of the location information.

Further, the processor 706 is configured to manage dissemination of the location information to the one or more MCX user 112. In an example, the processor 706 is configured to disseminate the location information based in accordance with the list and determining if the client is authorized to request managing dissemination of the location information. In an example, the processor 706 is configured to send a SIP message to the client device 108 upon determining the client device is one of authorized, not authorized to restrict the location information dissemination, in accordance with embodiments of the invention.

FIG. 8 illustrates another system architecture of the system 702 in the form of a computer system 800. The computer system 800 can include a set of instructions that can be executed to cause the computer system 800 to perform any one or more of the methods disclosed. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

The computer system 800 may include the processor 706 e.g., a central processing unit (CPU), a graphics processing unit (GPU), or both. The processor 706 may be a component in a variety of systems. For example, the processor 706 may be part of a standard personal computer or a workstation. The processor 706 may be one or more general processors, digital signal processors, application-specific integrated circuits, field-programmable gate arrays, servers, networks, digital circuits, analog circuits, combinations thereof, or other now known or later developed devices for analyzing and processing data. The processor 706 may implement a software program, such as code generated manually (i.e., programmed).

The computer system 800 may include a memory 708, such as a memory 708 that can communicate via a bus 808. The memory 708 may include but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 708 includes a cache or random-access memory for the processor 706. In alternative examples, the memory 708 is separate from the processor 706, such as a cache memory of a processor, the system memory, or other memory. The memory 708 may be an external storage device or database for storing data. The memory 708 is operable to store instructions executable by the processor 706. The functions, acts or tasks illustrated in the figures or described may be performed by the programmed processor 806 for executing the instructions stored in the memory 708. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 800 may or may not further include a display unit 810, such as a liquid crystal display (LCD), an organic light-emitting diode (OLED), a flat panel display, a solid-state display, a cathode ray tube (CRT), a projector, a printer or other now known or later developed display device for outputting determined information. The display 810 may act as an interface for the user to see the functioning of the processor 706, or specifically as an interface with the software stored in the memory 708 or the drive unit 816.

Additionally, the computer system 800 may include an input device 812 configured to allow the user to interact with any of the components of system 700. The computer system 800 may also include a disk or optical drive unit 816. The disk drive unit 816 may include a computer-readable medium 822 in which one or more sets of instructions 824, e.g., software, can be embedded. Further, the instructions 824 may embody one or more of the methods or logic as described. In a particular example, the instructions 824 may reside completely, or at least partially, within the memory 708 or within the processor 706 during execution by the computer system 800.

The present invention contemplates a computer-readable medium that includes instructions 824 or receives and executes instructions 824 responsive to a propagated signal so that a device connected to a network 826 can communicate voice, video, audio, images, or any other data over the network 826. Further, the instructions 824 may be transmitted or received over the network 826 via a communication port or interface 820 or using a bus 808. The communication port or interface 820 may be a part of the processor 706 or maybe a separate component. The communication port 820 may be created in software or maybe a physical connection in hardware. The communication port 820 may be configured to connect with a network 826, external media, the display 810, or any other components in system 800, or combinations thereof. The connection with the network 826 may be a physical connection, such as a wired Ethernet connection or may be established wirelessly as discussed later. Likewise, the additional connections with other components of the system 800 may be physical or may be established wirelessly. The network 826 may alternatively be directly connected to the bus 808.

The network 826 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

FIG. 9 illustrates a block diagram of a terminal (or a user equipment (UE)), according to embodiments of the present disclosure. The FIG. 9 may correspond to the UE 108 of FIG. 7.

As shown in FIG. 9, a terminal according to an embodiment may include a transceiver 910, a memory 920, and a controller 930. The transceiver 910, the memory 920, and the controller 930 of the terminal may operate according to a communication method of the terminal described above. However, the components of the terminal are not limited thereto. For example, the terminal may include more or fewer components than those described in FIG. 9. In addition, the controller 930, the transceiver 910, and the memory 920 may be implemented as a single chip. Also, the controller 930 may include at least one processor.

The transceiver 910 collectively refers to a terminal station receiver and a terminal transmitter, and may transmit/receive a signal to/from a base station or another terminal.

The signal transmitted or received to or from the terminal may include control information and data. The transceiver 910 may include a RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

Also, the transceiver 910 may receive and output, to the controller 930, a signal through a wireless channel, and transmit a signal output from the controller 930 through the wireless channel.

The memory 920 may store a program and data required for operations of the terminal. Also, the memory 920 may store control information or data included in a signal obtained by the terminal. The memory 920 may be a storage medium, such as read-only memory (ROM), random access memory (RAM), a hard disk, a CD-ROM, and a DVD, or a combination of storage media.

The controller 930 may control a series of processes such that the terminal operates as described above. For example, the controller 930 may receive a data signal and/or a control signal, and the controller 930 may determine a result of receiving the signal transmitted by a server via the base station.

FIG. 10 illustrates a block diagram of a server, according to embodiments of the present disclosure. The FIG. 10 may correspond to the server 102 of FIG. 7.

As shown in FIG. 10 is, the server of the present disclosure may include a transceiver 1010, a memory 1020, and a controller 1030. The transceiver 1010, the memory 1020, and the controller 1030 of the server may operate according to a communication method of the server described above. However, the components of the server are not limited thereto. For example, the server may include more or fewer components than those described in FIG. 10. In addition, the controller 1030, the transceiver 1010, and the memory 1020 may be implemented as a single chip. Also, the controller 1030 may include at least one processor.

The transceiver 1010 collectively refers to a server receiver and a server transmitter, and may transmit/receive a signal to/from a terminal, a base station, another server, and/or a core network function(s) (or entity(s)). The signal transmitted or received to or from the server may include control information and data. The transceiver 1010 may communicate with other entity(es) via a backhaul channel by using a wired communication. Or, the transceiver 1010 may include a RF transmitter for up-converting and amplifying a frequency of a transmitted signal, and a RF receiver for amplifying low-noise and down-converting a frequency of a received signal. However, this is only an example of the transceiver 1010 and components of the transceiver 1010 are not limited to the wired channel, the RF transmitter or the RF receiver.

Also, the transceiver 1010 may receive and output, to the controller 1030, a signal through a wireless channel, and transmit a signal output from the controller 1030 through the wireless channel.

The memory 1020 may store a program and data required for operations of the server. Also, the memory 1020 may store control information or data included in a signal obtained by the server. The memory 1020 may be a storage medium, such as ROM, RAM, a hard disk, a CD-ROM, and a DVD, or a combination of storage media.

The controller 1030 may control a series of processes such that the server operates as described above. For example, the controller 1030 may receive a data signal and/or a control signal, and the controller 1030 may determine a result of receiving the signal transmitted by the terminal via a base station and/or the core network function.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although this disclosure has been described with an exemplary embodiment, various changes and modifications may be suggested to one skilled in the art. It is intended that this disclosure encompass such changes and modifications as fall within the scope of the appended claims.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The present invention provides at least following advantages:

The client device may be a MCX client may restrict sharing of the location information with other MCX users. As location information is a privacy subject, the present invention provides advantage to manage its sharing. The present invention provides authorization check to restrict every client device from restricting the dissemination of location information. Only the client device with permission may be able to restrict the dissemination of location information.

The invention claimed is:

1. A method performed by a server in a wireless communication system, the method comprising:
   receiving, from a client device, a request for restricting location information dissemination, wherein the request for restricting the location information dissemination includes first information indicating to enable or disable the location information dissemination, second information on at least one mission critical (MC) service identity (ID) of at least one requesting MC service user and third information on a list of MC service IDs of at least one MC service user for indicating that the restriction of the location information dissemination is applicable;
   transmitting, to the client device, a response to the request for restricting the location information dissemination;
   transmitting, to the client device, a configuration for a location information report or a request for the location information report; and
   receiving, from the client device, location information of the client device.

2. The method of claim 1, wherein the response includes fourth information indicating a result of restricting the location information dissemination.

3. The method of claim 1, further comprising identifying authority of the client device to restrict the location information dissemination isbased on user profile data.

4. A method performed by a client device in a wireless communication system, the method comprising:

transmitting, to a server, a request for restricting location information dissemination, wherein the request for restricting the location information dissemination includes first information indicating to disable the location information dissemination, second information on at least one mission critical (MC) service identity (ID) of at least one requesting MC service user and third information on a list of MC service IDs of at least one MC service user for indicating that the restriction of the location information dissemination is applicable;

receiving, from the server, a response to the request for restricting the location information dissemination;

receiving, from the server, a configuration for a location information report or a request for the location information report; and transmitting, to the server, location information of the client device.

5. The method of claim 4, wherein the response includes fourth information indicating a result of restricting the location information dissemination.

6. The method of claim 4, wherein authority of the client device to restrict the location information dissemination is based on user profile data.

7. A server, comprising:

at least one transceiver; and at least one processor communicatively coupled to the at least one transceiver, and at least one memory, communicatively coupled to the at least one processor, storing instructions executable by the at least one processor individually or in any combination to cause the server to:

receive, from a client device, a request for restricting location information dissemination, wherein the request for restricting the location information dissemination includes first information indicating to disable the location information dissemination, second information on at least one mission critical (MC) service identity (ID) of at least one requesting MC service user and third information on a list of MC service IDs of at least one MC service user for indicating that the restriction of the location information dissemination is applicable, transmit, to the client device, a response to the request for restricting the location information dissemination, transmit, to the client device, a configuration for a location information report or a request for the location information report, and receive, from the client device, location information of the client device.

8. The server of claim 7, wherein the response includes fourth information indicating a result of restricting the location information dissemination.

9. The server of claim 7, wherein the instructions further cause the server to identify authority of the client device to restrict the location information dissemination is based on user profile data.

10. A client device, comprising:

at least one transceiver; and at least one processor communicatively coupled to the at least one transceiver, and at least one memory, communicatively coupled to the at least one processor, storing instructions executable by the at least one processor individually or in any combination to cause the client device to:

transmit, to a server, a request for restricting location information dissemination, wherein the request for restricting the location information dissemination includes first information indicating to disable the location information dissemination, second information on at least one mission critical (MC) service identity (ID) of at least one requesting MC service user and third information on a list of MC service IDs of at least one MC service user for indicating that the restriction of the location information dissemination is applicable, receive, from the server, a response to the request for restricting the location information dissemination, receive, from the server, a configuration for a location information report or a request for the location information report, and transmit, to the server, location information of the client device.

11. The client device of claim 10, wherein the response includes fourth information indicating a result of restricting the location information dissemination.

12. The client device of claim 10, wherein authority of the client device to restrict the location information dissemination is based on user profile data.

* * * * *